United States Patent [19]
Vasiliev et al.

[11] 3,815,977
[45] June 11, 1974

[54] PHOTO-DETECTOR

[76] Inventors: Vladimir Pavlovich Vasiliev, Bogorodskoe, 48, korpus 23, kv. 239; Boris Mikhailovich Glukhovskoi, Belomorskaya ulitsa, 22, korpus 3, kv. 25; Oleg Mikhailovich Golubovsky, ulitsa Gorkogo, 17, kv. 137; Georgy Eduardovich Kufal, Novogireevskaya ulitsa, 14, korpus 2, kv. 72; Leonid Filippovich Pliev, Novogireevskaya ulitsa, 23, kv. 66, all of Moscow, U.S.S.R.

[22] Filed: June 8, 1973

[21] Appl. No.: 368,119

Related U.S. Application Data

[63] Continuation of Ser. No. 162,349, July 14, 1971, abandoned.

[52] U.S. Cl................. 350/286, 350/299, 356/236
[51] Int. Cl. .............................................. G02b 5/04
[58] Field of Search ........... 350/288, 299, 286, 287; 250/228, 307; 356/236

[56] References Cited
UNITED STATES PATENTS
3,415,602  12/1968  Harrick............................. 350/286

OTHER PUBLICATIONS

Hirschfeld, "Total Internal Reflection Enhancement of Photodetector Performance," Analytical Chem., Dec. 1970, Vol. 42, No. 14, pp. 87A–92A.

*Primary Examiner*—Ronald L. Wilbert
*Assistant Examiner*—Michael J. Tokar
*Attorney, Agent, or Firm*—Eric H. Waters

[57] ABSTRACT

The present invention relates to photo-detectors.

The invention resides in that on the photo-sensitive side a photo-detector has a right prism made of an optically transparent material. The two approximately parallel bases of the prism are bounded by a side surface containing an entrance face through which a light beam is admitted, a reflecting face which together with the base and photo-sensitive layer participates in the reflections of the admitted light beam, and at least one additional reflecting face. The edge of the entrance face, which is a side of the base of the right prism, is unparallel to the first reflecting side face.

5 Claims, 4 Drawing Figures

PHOTO-DETECTOR

CROSS-RELATED APPLICATION

This application is a continuation of copending application Ser. No. 162,349, filed July 14, 1971, now abandoned.

The present invention relates to optical instruments and, more specifically, to photo-detectors.

Known in the prior art is a photo-detector the sensitivity of which is enhanced by a right prism placed on the photo-sensitive side (on the substrate of the photo-sensitive layer). This prism has an entrance face through which a light beam is admitted into the prism at the requisite angle to the photo-sensitive layer (if use is made of photo-cells or photo-multiplier tubes, this is the angle of total internal reflection). On being reflected from the photo-sensitive layer, the light beam strikes the top base of the prism at the angle of total internal reflection and is again directed to the photo-sensitive layer. After one or several reflections from the photo-sensitive layer and the top base of the prism, the light beam strikes a reflecting side face parallel to the edges of the entrance face, which are the sides of the bases of the prism. On being reflected from the side face, the light beam undergoes for a second time the same sequence of reflections from the photo-sensitive layer and the top base of the prism, propagating in the same plane as in the first cycle of reflections. As a result, the light beam again strikes the entrance face and leaves the prism.

This arrangement suffers from a disadvantage that use has to be made of a photo-sensitive layer whose dimensions considerably exceed the cross-sectional area of the light beam, especially when it is sought to obtain a sufficiently large number of reflections of the beam from the photo-sensitive layer. This imposes marked limitations on the cross-sectional area of the admitted light beam, involving additional technical difficulties in using such photo-detectors.

Additionally, the use of photo-detectors with a large surface area of the photo-cathode inevitably increases the thermionic current which interferes with the registration of weak light signals. In this connection, it is not always justified to use the above-mentioned arrangement.

It is an object of the present invention to avoid the above-mentioned disadvantages.

The invention aims at providing a photo-detector the sensitivity of which is enhanced by means of a right prism effecting the multiple reflections of the light beam from the photo-sensitive layer owing to certain changes in the design of this right prism.

With this aim in view, the present invention residein that in a photo-detector according to the invention the right prism has at least one additional reflecting side face and the edge of the entrance face, which is a side of the base of the right prism, is nonparallel to the first reflecting side face.

It is preferable to make a polyhedral right prism symmetrical about the bisecting plane of a dihedral angle formed by the reflecting side faces and to select the height $h$ of the prism such that, with the photo-sensitive layer having a thickness $d$, the following approximate condition will be satisfied:

$$h \approx R(1 + \cos \phi)\tan \psi - d,$$

where $\psi$ = angle of incidence of the light beam on the photo-sensitive layer;
$\phi$ = angle between two consecutive planes of propagation of the light beam;
$R$ = radius of the circle lying in the plane of the lower base of the prism, the center of which is at the point of intersection between the planes of the lower base of the prism, the bisecting plane, and the plane of propagation of the light beam passing through the entrance face, while the edges of the entrance face and of the last reflecting face are tangent to this circle.

At the same time, it is preferable to set up on the last reflecting face an additional optical element in order to rotate the light beam through 180°.

The photo-detector disclosed herein is intended to register resides in divergent light beams, and the polyhedral right prism enhancing the sensitivity of the photo-detector may be used in practically all commercially produced photo-detectors.

Among the advantages of the photo-detector disclosed herein are:

1. High integral and spectral sensitivity at low levels of thermionic emission.
2. A marked increase in the cross-sectional area of the utilized light beam so that it is comparable to the surface area of the photo-sensitive layer.
3. The possibility of making photo-cells and photo-multiplier tubes with a quantum output of at least 35 percent at $\lambda < 700$ nm due to an optimum match between the thickness of the cathode and the number of reflections of the light beam.
4. The manufacture of high-performance photo-detectors by flow-line methods due to the straightforward technology involved and the absence of any subsidiary operations (such as application of a mirror layer to the side faces of the prism, etc.). 5. The possibility of making still more effective photo-detectors through the use of multiple reflections of the light beam from the most sensitive areas of the photo-sensitive layer.

The invention will be more fully understood from the following description of preferred embodiments when read in connection with the accompanying drawings wherein.

Figure 2:
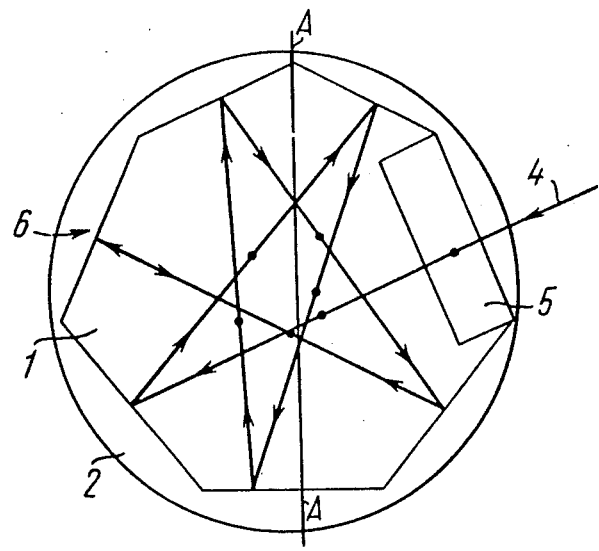
FIG. 2 is a top plan view of the same photo-detector.
Figure 1:
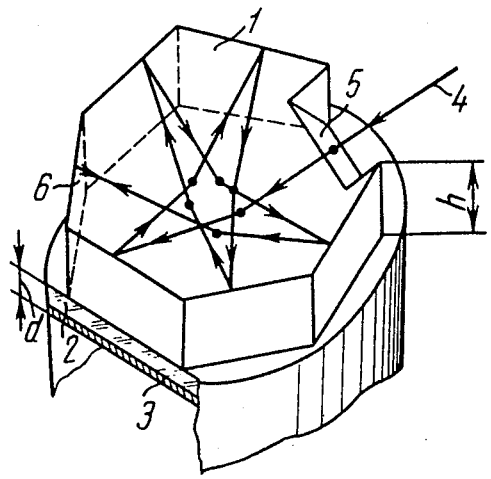
FIG. 1 is an isometric view of a photo-detector according to the invention, having a bevelled right prism installed on the photo-sensitive layer side.

Referring to FIGS. 1 and 2, there is seen a photo-detector consisting of a polyhedral right prism 1 made of an optically transparent material, a substrate 2, and a photo-sensitive layer 3. The prism 1 has its lower base on the substrate 2 and is anchored there by optical contact or with optical cement having a refractive index close to that of the material of the substrate 2 and prism 1, so that the entire surface of the lower base of the prism 1 is projected on the photo-sensitive layer 3. One of the faces (face 5) of the prism 1 is bevelled at an angle to the lower base of the prism 1 and is intended to guide the light beam 4 to the photo-sensitive layer 3. The entrance (bevelled) face 5 may be any of the side faces of the prism 1, adjacent to a reflecting side face. The last reflecting face 6 along the path of the beam 4 is at right angles to the plane of propagation of the beam 4 incident on that face 6, while the remaining faces make an angle with the plane in which the light beam 4 is propagated before it is reflected from the respective face, this angle being other than 90° and constant for all faces. Thus, the polyhedral right prism 1 is symmetrical about the bisecting plane AA of one of the reflecting dihedral angles while the entrance face 5 and the last reflecting side face 6 are symmetrical about that bisecting plane AA. At the same time, the planes of propagation of the light beam 4 pass through chords of a circle lying in the plane of the lower base of the prism 1. The center of this circle is in the bisecting plane AA, the edges of the last reflecting face 6 and of the entrance face 5 lying on the lower base of the prism 1 are at right angles to the respective chords of this circle, and the similar edges of the remaining reflecting side faces are tangent to the circle.

The height h of the prism 1 is chosen such that, with the substrate 2 of the photo-cathode 3 having a thickness $d$, the following approximate condition will be satisfied $$h \approx R \cos \phi \; 12/n \tan \psi - d$$

where $\psi$ = angle of incidence of the light beam 4 on the photo-cathode 3;

$\phi$ = angle between two consecutive planes of propagation of the light beam 4;

$R$ = radius of the said circle;

$n$ - number of reflections of the light beam from the photo-sensitive layer as it passes through two side reflecting faces following one after another along the path of the beam.

The photo-detector is positioned so that the light beam 4 is incident normally on the entrance face 5 of the prism 1. The bevel of the entrance face 5 relative to the lower base of the prism 1 is chosen such that the light beam 4 strikes the photo-sensitive layer 3 (the photo-cathode) at the angle of the total internal reflection. On being reflected from the photo-cathode 3, the light beam 4 either strikes the top base of the prism 1 to be reflected from it and again to strike the photo-cathode 3, to be reflected for another time towards the top base, and so on, or falls at once on the edge of the dihedral angle formed by the reflecting side face and the top base of the prism 1, depending on the height h of the prism 1. This dihedral angle acts as a mirror. Since the plane of incidence of the light beam 4 is not perpendicular to the reflecting side face, the light beam is now reflected in a plane turned through an angle relative to the previous plane of propagation. As a result, the beam 4 again experiences a multiple or a single reflection from the photo-cathode 3 and strikes the next reflecting side face. Its plane of propagation is again rotated, and the beam, on being reflected from the photo-cathode 3 in the new plane, strikes the next reflecting side face, and so on. Finally, the light beam 4 strikes the last reflecting face 6 which is at right angles to the plane of incidence of the beam 4. Therefore, it is reflected through 180°, and all the steps of reflection from the side reflecting faces and from the photo-cathode 3 are repeated in reverse order until the light beam 4 again strikes the entrance 5 and leaves the prism 1.

The polyhedral prism 1 just described should preferably be used in cases where it is essential to increase the sensitivity of a photo-detector while keeping to a minimum the effect of thermionic noise (such as in photocells).

Figure 4:
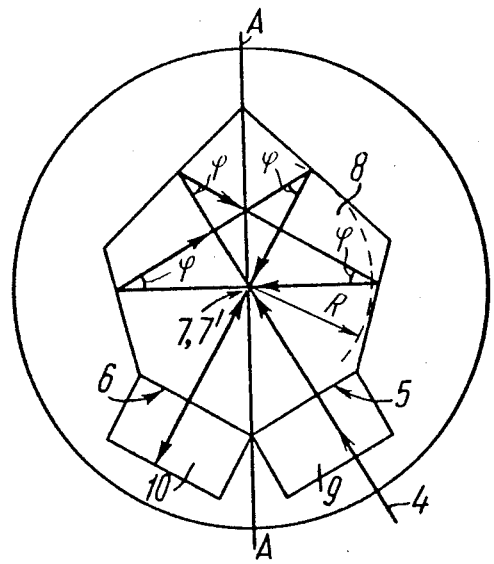
FIG. 4 is a top plan view of the photo detector of FIG. 3.
Figure 3:
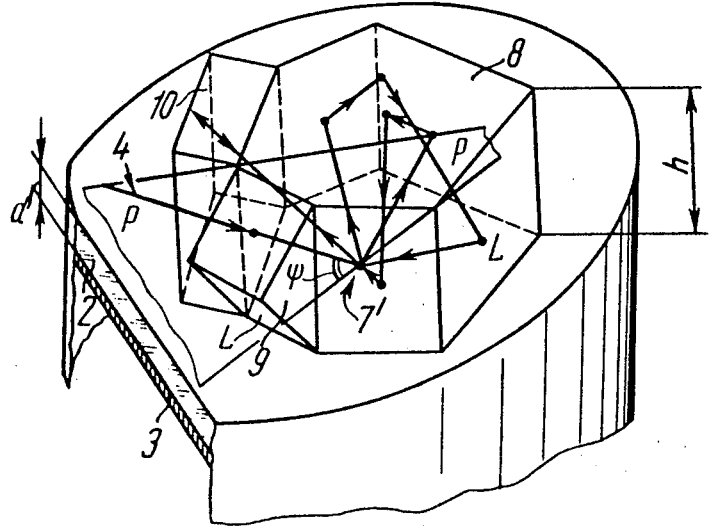
FIG. 3 is an isometric view of a photo-detector according to the invention, on the photo-sensitive side of which there is a right prism with additional optical elements.

In registering extremely weak light fluxes (as in the case of photo-multiplier tubes), when thermionic noise might limit the sensitivity of the photo-detector, it is advisable to use a modified element such as shown in FIGS. 3 and 4. In this photo-detector, the photo-cathode 3 is comparable in size with the cross-sectional area of the light beam 4, owing to which the axis of this beam 4 in all reflections from the photo-cathode 3 always passes through one and the same point 7. This modification differs from the photo-detector described before mainly in that the height $h$ of its polyhedral right prism is about twice as great as that in the previous embodiment. Additionally, in this embodiment the polyhedral right prism 8 has additional optical elements set up on the entrance and last reflecting faces. The optical element 9 set up on the entrance face 5 of the prism 8 is a prism or wedge of an optically transparent material and serves to guide the light beam 4 onto the photo-cathode 3. The light beam 4 may be directed onto the optical element 9 at any angle to the axis of the photo-detector, even parallel with that axis. The optical element 10 set up on the exit face 6 may be a parallelepiped having a reflecting right dihedral angle. The entrance face 5 of the prism 8 is one of the side faces whose edges make the largest angle with the symmetry plane AA. The last reflecting face 6 carrying the additional optical element 10, as in the previous case, is symmetrical relative to the entrance face 5 and is on the other side of the bisecting plane of symmetry AA of the prism 8. In contrast to the previous embodiment, however, the light beam 4 is propagated in planes passing through the chords and diameters of a circle the center 70' of which lies in the bisecting plane of symmetry AA of the prism 8. The edges of the entrance face 5 and of the last reflecting side face 6 of the prism 8, lying in the plane LL of the lower base, are tangent to the said circle. Thus, the center 7' of the circle lies at the point of intersection of three planes, namely: the lower base LL of the prism 8, the bisecting plane AA, and the plane PP of propagation of the light beam after its passage through the entrance face 5 of the prism 8, while the edges of the remaining reflecting side faces lying in the plane LL of the lower base of the prism 8 are at right angles to the bisectors of the angles formed by the chord and diameter of said circle through which the planes of propagation of the incident and reflected light beams 4 pass. In this embodiment, the height $h$ of the prism 8 is chosen such that, with the substrate 2 of the photo-cathode 3 having a thickness $d$, the following approximate condition is satisfied:

$$h \approx R(1 + \cos \phi) \tan \psi - d$$

where $\psi$ = angle of incidence of the light beam 4 on the photo-cathode 3;

$\phi$ = angle between two consecutive planes of propagation of the light beam 4;

$R$ = radius of the above-mentioned circle.

The photo-detector of FIG. 3 is positioned so that the light beam 4, on passing through the additional optical element 9 and the entrance face 5 of the prism, is propagated in a plane PP normal to the entrance face 5 of the prism 8. The axis of the light beam 4 should pass through the point 7 on the photo-cathode 3 under the center 7' of the above-mentioned circle, and the angle that this axis makes with the photo-cathode 3 should be equal to the angle of total internal reflection of the light beam 4.

On being reflected from the photo-cathode 3, the light beam 4 strikes the first reflecting side face. The direction in which it is propagated is changed, it is reflected onto the top base of the prism 8 and then strikes the second reflecting side face of the prism 8. On being reflected from the second reflecting side face, the light beam 4 is again directed onto the photo-cathode 3. In this case, the axis of the light beam 4 passes through the same point 7 as in the first reflection from the photo-cathode 3. Then the light beam 4 is reflected from the photo-cathode 3 and strikes the next reflecting side face which directs the light beam 4 onto the top base of prism 8. On being reflected from the top base of the prism 8, the light beam 4 strikes the next reflecting side face and is again directed onto the photo-cathode so that the axis of the light beam 4 traverses the photo-cathode 3 at the same point 7 as in the previous reflections. These reflections of the light beam 4 from the photo-cathode 3, the reflecting side faces, and the top base of the prism continue until the light beam strikes the last reflecting face 6 carrying the additional optical element 10. This element reflects the incident light beam 4 at an angle of 180°, after which the entire sequence of reflections is repeated in reverse order, until the light beam 4 leaves the prism 8 by the entrance face 5.

What is claimed is:

1. A photo-detector comprising a photo-sensitive layer on a substrate; a right prism of an optically transparent material having two approximately parallel bases which are bounded by a side surface and which is mounted on said substrate of the photo-sensitive layer; said side surface of said prism having an entrance face through which a light beam is admitted, a reflecting face which together with the base and photo-sensitive layer participate in reflecting the admitted light beam, and at least one additional reflecting side face participating together with the first said reflecting side face, base and photo-sensitive layer in the reflections of the admitted light beam; said entrance face having a surface which is inclined to the bases along the path of the light beam to direct the light beam into the prism at an angle with respect to the parallel bases thereof, the last reflecting side face including means to rotate the light beam incident thereon 180° to return the light beam along its path whereby the light beam travels along said path to undergo successive reflection in the prism and exit from the entrance face.

2. A photo-detector, as in claim 1, in which said right prism is symmetrical about a bisecting plane of the dihedral angle formed by said reflecting side faces.

3. A photo-detector as in claim 1 in which said means on the last reflecting side face comprises an optical element made of an optically transparent material and which contains a right dihedral reflecting angle formed by faces one of which is parallel to the base of the prism.

4. A photo-detector, as in claim 1, in which the height h of said right prism is chosen such that, with the substrate of said photo-sensitive layer having a thickness $d$, the following approximate condition will be satisfied:

$$h \approx R(1 + \cos \phi) \tan \psi - d$$

where $\psi$ = angle of incidence of the light beam on the photo-sensitive layer;
$\phi$ = angle between two consecutive planes of propagation of the light beam;
$R$ = radius of the circle lying in the plane of the lower base of said right prism, the centre of which is at the point of intersection of the plane of the lower base of the right prism, the plane of propagation of the light beam incident on the entrance face, and the plane of the lower base of the prism, while the edges of the entrance and last reflecting side faces are tangent to that circle.

5. A photo-detector as claimed in claim 2 wherein the height $h$ of said right prism is related to the thickness $d$ of the substrate of said photo-sensitive layer in accordance with the following equation:

$$h = R(1 + \cos \phi) \tan \psi - d$$

wherein $\psi$ is angle of incidence of the light beam on the photo-sensitive layer;
$\phi$ is angle between two consecutive planes of propagation of the light beam; and
$R$ is the radius of a circle lying the in the plane of the lower base of said right prism, the center of which is at the point of intersection of the plane of the lower base of said prism, said bisecting plane and a plane of propagation of the light beam passing said entrance face, while the edges of said entrance face and said last reflecting side face are tangent to said circle.

* * * * *